(12) United States Patent
Zhang

(10) Patent No.: US 12,055,117 B2
(45) Date of Patent: Aug. 6, 2024

(54) METHOD AND DEVICE FOR OPERATING A HYBRID VEHICLE

(71) Applicant: Vitesco Technologies GmbH, Regensburg (DE)

(72) Inventor: Hong Zhang, Tegernheim (DE)

(73) Assignee: Vitesco Technologies GmbH, Regensburg (DE)

( * ) Notice: Subject to any disclaimer, the term of this patent is extended or adjusted under 35 U.S.C. 154(b) by 0 days.

(21) Appl. No.: 18/355,690

(22) Filed: Jul. 20, 2023

(65) Prior Publication Data

US 2024/0060461 A1 Feb. 22, 2024

Related U.S. Application Data

(63) Continuation of application No. PCT/EP2022/050988, filed on Jan. 18, 2022.

(30) Foreign Application Priority Data

Jan. 20, 2021 (DE) .................. 10 2021 200 474.1

(51) Int. Cl.
*F02M 25/08* (2006.01)

(52) U.S. Cl.
CPC .... *F02M 25/0818* (2013.01); *F02M 25/0854* (2013.01)

(58) Field of Classification Search
CPC .......... F02M 25/0818; F02M 25/0854; F02M 25/0809; Y02T 10/62; B60K 6/24;

(Continued)

(56) References Cited

U.S. PATENT DOCUMENTS 7,966,996 B1 * 6/2011 Pursifull ............. F02M 25/089
123/198 C
2014/0318504 A1 10/2014 Pearce
(Continued)

FOREIGN PATENT DOCUMENTS

DE 102013221797 A1 4/2015
DE 102017210768 A1 12/2018

OTHER PUBLICATIONS

International Search Report and Written Opinion dated Apr. 21, 2022 from corresponding International Patent Application No. PCT/EP2022/050988.

(Continued)

*Primary Examiner* — Xiao En Mo

(57) ABSTRACT

The disclosure relates to a method and a device for operating a hybrid vehicle having an internal combustion engine, an electric motor, a fuel tank, an activated carbon filter, an air filter, an intake tract, a purging line arranged between the activated carbon filter and the intake tract, a purge air pump arranged between the activated carbon filter and the intake tract, a tank purge valve arranged between the purge air pump and the intake tract, and a ventilation arranged between the fresh air filter and the activated carbon filter. The hybrid vehicle can be operated in an electric mode in which the electric motor is activated and the internal combustion engine is deactivated. In such a hybrid vehicle, in electric mode the purge air pump is activated and detection of the concentration of hydrocarbons present in the activated carbon filter is performed with the purge air pump activated.

20 Claims, 2 Drawing Sheets

(58) Field of Classification Search
CPC ...... B60W 10/06; B60W 10/30; B60W 20/15; B60W 20/40; F02D 41/0045; F02D 41/042; F02D 41/0042; B60Y 2200/92
See application file for complete search history.

(56) References Cited

U.S. PATENT DOCUMENTS

| | | |
|---|---|---|
| 2016/0177882 A1 | 6/2016 | Dudar |
| 2017/0096974 A1 | 4/2017 | Dudar |
| 2017/0356360 A1* | 12/2017 | Dudar ................ F02M 25/0809 |
| 2018/0066595 A1 | 3/2018 | Dudar |
| 2018/0372030 A1 | 12/2018 | Achleitner |
| 2019/0242310 A1 | 8/2019 | Dudar |
| 2019/0360434 A1 | 11/2019 | Dudar |

OTHER PUBLICATIONS

German Search Report dated Jul. 21, 2021 for corresponding German Patent Application No. 10 2021 200 474.1.

* cited by examiner

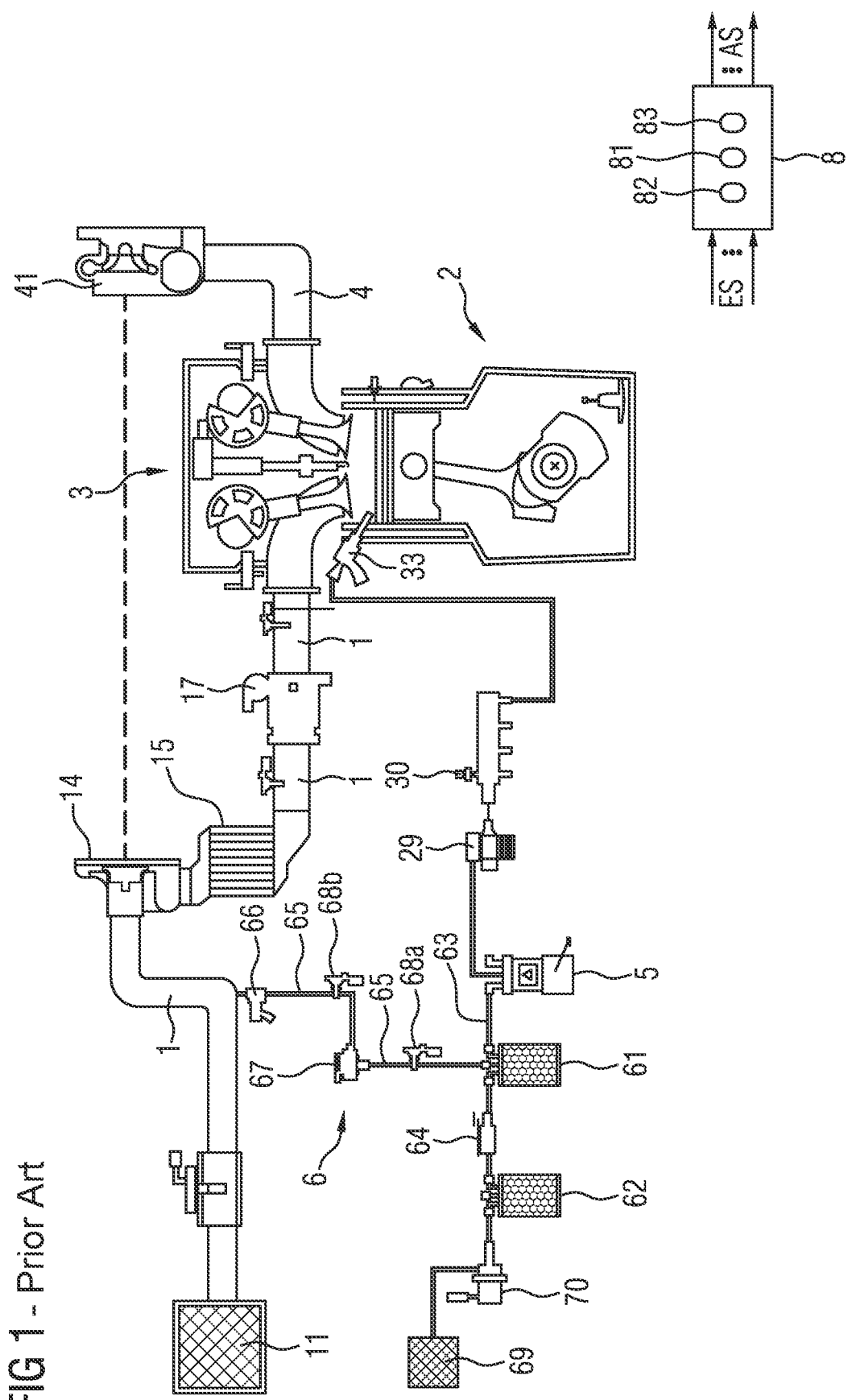
FIG 1 - Prior Art

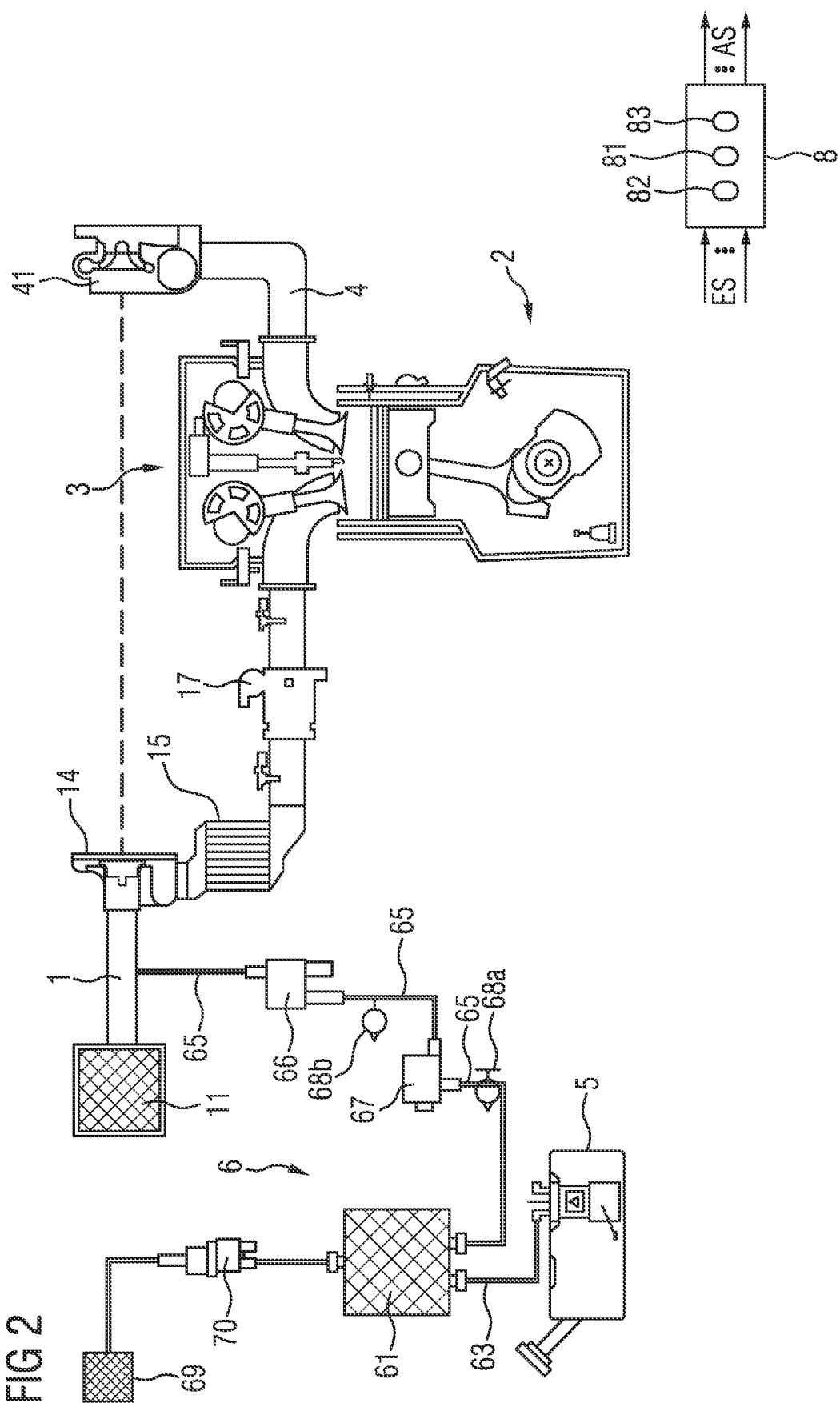

METHOD AND DEVICE FOR OPERATING A HYBRID VEHICLE

CROSS-REFERENCE TO RELATED APPLICATIONS

This application claims the benefit of PCT Application PCT/EP2022/050988, filed Jan. 18, 2022, which claims priority to German Application 10 2021 200 474.1, filed Jan. 20, 2021. The disclosures of the above applications are incorporated herein by reference.

TECHNICAL FIELD

The disclosure relates to a method and to a device for operating a hybrid vehicle.

BACKGROUND

Activated carbon filters are known to be used in a motor vehicle. These activated carbon filters store evaporative emissions from the fuel tank of the respective motor vehicle. During the operation of the vehicle with an internal combustion engine, evaporative emissions are sucked out from the activated carbon filter at suitable operating points using an active purge air pump. These sucked-out evaporative emissions are fed to an intake tract of the motor vehicle and thus supplied for the combustion process.

In the case of hybrid vehicles having an electric motor and an internal combustion engine, it is furthermore already known to activate the internal combustion engine only when the charging state of the vehicle battery falls below a predetermined threshold or when a temporary torque requirement exceeds a different predetermined threshold. For this reason, in the case of hybrid vehicles, a sealed tank is used in order to avoid the undesired escape of hydrocarbon vapors from the tank and to the surroundings.

If, in contrast, in the case of hybrid vehicles, a non-sealed tank is used, it is necessary to detect the penetration of hydrocarbons through the activated carbon filter to activate the internal combustion engine and suck the evaporative emissions stored in the activated carbon filter into the intake tract before undesired hydrocarbon vapors can pass to the surroundings.

In order to detect such a penetration of hydrocarbons, it is already known to use a hydrocarbon sensor. This hydrocarbon sensor is arranged between the activated carbon filter of the hybrid vehicle and an additional auxiliary activated carbon filter. During electrical operation of the hybrid vehicle, when the concentration of hydrocarbons measured by the hydrocarbon sensor is greater than a predetermined threshold value, the internal combustion engine is activated in order to convey the evaporative emissions stored in the activated carbon filter into the intake tract to supply them for the combustion process. This happens until the hydrocarbon load of the activated carbon filter is again below a predetermined further threshold value. Disadvantages of this procedure includes the fact that it requires the use of a hydrocarbon sensor and an additional auxiliary activated carbon filter.

SUMMARY

The disclosure provides a method for operating a hybrid vehicle which does not have the abovementioned disadvantages.

One aspect of the disclosure provides a method for operating a hybrid vehicle. The hybrid vehicle includes an internal combustion engine, an electric motor, a fuel tank, an activated carbon filter, an air filter, an intake tract, a purging line arranged between the activated carbon filter and the intake tract, a purge air pump arranged between the activated carbon filter and the intake tract, a tank purge valve arranged between the purge air pump and the intake tract, and a ventilation valve arranged between the air filter and the activated carbon filter. The hybrid vehicle may be operated in an electric mode in which the electric motor is activated and the internal combustion engine is deactivated. In the electric mode, the purge air pump is activated and detection of the concentration of hydrocarbons present in the activated carbon filter is performed with the purge air pump activated.

An advantage of this method include the fact that the use of a hydrocarbon sensor and an auxiliary activated carbon filter is not necessary.

In some examples, in the electric mode, the speed of the purge air pump is regulated to a predetermined target speed and the ventilation valve arranged between the fresh air filter and the activated carbon filter is opened and the tank purge valve closed.

In some implementations, a pressure difference between a pressure value upstream from the purge air pump and a pressure value downstream from the purge air pump is determined in the electric mode and the determined pressure difference and the speed of the purge air pump are used to determine the concentration of hydrocarbons.

In some examples, in the case where the determined concentration of hydrocarbons is greater than a predetermined first threshold value, the internal combustion engine is activated and the tank purge valve opened and the evaporative emissions stored in the activated carbon filter are conveyed through the opened tank purge valve into the intake tract until the concentration of hydrocarbons is less than a predetermined second threshold value.

In some examples, when the determined concentration of hydrocarbons does not exceed the predetermined first threshold value, the purge air pump is deactivated again.

In some implementations, the purge air pump is activated in the electric mode as a reaction to a vehicle start-up for electric driving immediately after the vehicle start-up for electric driving.

In some examples, the detection of the concentration of hydrocarbons present in the activated carbon filter is performed with the purge air pump activated.

In some examples, the detection of the concentration of hydrocarbons present in the activated carbon filter is performed immediately after the activation of the purge air pump.

In some examples, the detection of the concentration of hydrocarbons present in the activated carbon filter is performed after the activation of the purge air pump depending on one or more further criteria.

In some examples, a further criterion is the most recent measurement of the concentration of hydrocarbons.

In some implementations, a further criterion is a value for the concentration of hydrocarbons determined in the most recent measurement of the concentration of hydrocarbons.

In some examples, a further criterion is the period of time between the most recent measurement of the concentration of hydrocarbons and the vehicle start-up for electric driving.

In some implementations, a further criterion is the maximum ambient temperature between the most recent measurement of the concentration of hydrocarbons and the vehicle start-up for electric driving.

Another aspect of the disclosure provides a device for performing a method for operating a hybrid vehicle which has a control unit designed to control the method described above.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1 shows a schematic view of a prior art device.
FIG. 2 shows a schematic view of an exemplary device.
Like reference symbols in the various drawings indicate like elements.

DETAILED DESCRIPTION

FIG. 1 shows a diagram for explaining a known device. This device includes an internal combustion engine, which contains, inter alia, an intake tract 1, an engine block 2, a cylinder head 3, an exhaust gas tract 4, a fuel tank 5, a tank purge device 6, an exhaust gas turbocharger which includes a compressor 14 and a turbine 41, and a control unit 8.

In the flow direction of the intake air and starting from an air filter 11, the intake tract 1 includes the compressor 14 of the exhaust gas turbocharger, an intercooler 15, and a throttle valve 17 and opens into a combustion chamber of the engine block 2.

The engine block 2 includes a crankshaft which is coupled via a connecting rod to a piston of a cylinder. The motive power generated by the combustion process is transmitted via the crankshaft to a drive train (not illustrated in FIG. 1). The piston and the cylinder define the combustion chamber.

The cylinder head 3 includes a valve drive with at least one gas inlet valve and drive devices for these valves. Here this preferably takes the form of a so-called variable valve drive, in which the actuation of the at least one gas inlet valve is largely, or even fully, decoupled from the movement of the crankshaft. The cylinder head 3 furthermore includes a fuel injector 33 and a spark plug.

The exhaust gas tract 4 branches off from the combustion chamber of the engine block 2, and the turbine 41 of the exhaust gas turbocharger, a three-way catalytic converter, and a particle filter are arranged in its continuation.

The internal combustion engine illustrated in FIG. 1 moreover has a fuel supply apparatus which supplies the fuel injector 33 with fuel. The fuel is conveyed from the fuel tank 5 by an electric fuel pump generally arranged inside the fuel tank and having a prefilter and is then fed to the fuel injector 33 via a high-pressure pump 29. A fuel high-pressure sensor 30 is arranged in the fuel high-pressure line between the high-pressure pump 29 and the fuel injector 33.

Furthermore, the diagram illustrated in FIG. 1 has a tank purge device 6. This tank purge device 6 includes an activated carbon filter 61 which is connected to an air filter 69 via an auxiliary activated carbon filter 62 and a ventilation valve 70. A penetration sensor 64, designed to detect the penetration of hydrocarbons, is arranged between the auxiliary activated carbon filter 62 and the activated carbon filter 61. The ventilation valve 70 can be actuated by control sensors from the control unit 8.

The activated carbon filter 61 is moreover connected to the intake tract 1 of the internal combustion engine at a location between the air filter 11 and the compressor 14 via a purging line 65 in which a purge air pump 67 and a tank purge valve 66 are arranged. The tank purge valve 66 and the purge air pump 67 can be actuated by control signals output by the control unit 8 in order to adjust the flow of gas through the purging line 65. A pressure sensor 68a, the output signals of which are supplied to the control unit 8, is arranged in the purging line 65, upstream from the purge air pump 67. A further pressure sensor 68b, the output signals of which are likewise supplied to the control unit 8, is arranged in the purging line 65, downstream from the purge air pump 67.

The activated carbon filter 61 is moreover connected to the fuel tank 5 via a connecting line. The evaporative emissions which occur in the fuel tank, in particular the volatile hydrocarbons, are led into the activated carbon filter 61 and are adsorbed there by the activated carbon situated therein.

With continued reference to FIG. 1, the control unit 8 has a computing unit 81, a program memory 82, and a data memory 83. Work programs for the computing unit 81 are saved in the program memory 82. Data which is required for operation of the internal combustion engine is saved in the data memory 83. The output signals of a plurality of sensors are furthermore supplied to the control unit 8 as input signals ES. These sensors include, inter alia, the pressure sensors 68a and 68b, an air mass sensor which detects an air mass flow in the intake tract 1 upstream from the compressor 14, a temperature sensor which detects an intake air temperature, a temperature sensor which detects the temperature of the coolant of the internal combustion engine, and a further pressure sensor which detects the pressure in the intake tract 1 downstream from the throttle valve 17. At the output side, the control unit 8 provides control signals AS which it determines using the work programs, the stored data, and the sensor signals supplied to it. These control signals include, inter alia, control signals for the ventilation valve 70, the purge air pump 67, and the tank purge valve 66.

With the aid of the purge air pump 67, it is possible to adjust a desired purging flow of the purge gas (HC/air mixture) from the activated carbon filter 61 for all operating points of the internal combustion engine.

In the case of a hybrid vehicle which has an internal combustion engine and an electric motor, the internal combustion engine is activated only when the battery state of the hybrid vehicle falls below a predetermined threshold value or when a temporary torque requirement exceeds a predetermined different threshold value.

If, in the case of such a hybrid vehicle, a non-sealed tank is used, the penetration of hydrocarbons must be detected in order to activate the internal combustion engine and suck the evaporative emissions stored in the activated carbon filter into the intake tract 1 via the purging line 65 before hydrocarbons pass into the atmosphere.

The hydrocarbon sensor 64 arranged between the activated carbon filter 61 and the auxiliary active filter 62 is provided in order to detect such a penetration of hydrocarbons. This hydrocarbon sensor 64 detects, during the electric mode of the hybrid vehicle, that the measured concentration of hydrocarbons is greater than a predetermined threshold value and notifies the control unit 8 of this. The latter thereupon activates the internal combustion engine and controls the purge air pump 67 and the tank purge valve 66 in such a way that the evaporative emissions stored in the activated carbon filter are pumped into the intake tract 1 and supplied to the combustion process. This happens until the hydrocarbon load of the activated carbon filter 61 has again fallen below a predetermined different threshold value.

FIG. 2 shows a diagram for explaining an example of the disclosure.

The device illustrated in FIG. 2 shows an internal combustion engine, which contains, inter alia, an intake tract 1, an engine block 2, a cylinder head 3, an exhaust gas tract 4, a fuel tank 5, a tank purge device 6, an exhaust gas turbocharger which includes a compressor 14 and a turbine 41, and a control unit 8.

In the flow direction of the intake air and starting from an air filter 11, the intake tract 1 includes the compressor 14 of the exhaust gas turbocharger, an intercooler 15, and a throttle valve 17 and opens into a combustion chamber of the engine block 2.

The engine block 2 includes a crankshaft which is coupled via a connecting rod to a piston of a cylinder. The motive power generated by the combustion process is transmitted via the crankshaft to a drive train (not illustrated in the Figure). The piston and the cylinder define the combustion chamber.

The cylinder head 3 includes a valve drive with at least one gas inlet valve and drive devices for these valves. Here this takes the form of a so-called variable valve drive, in which the actuation of the at least one gas inlet valve is largely, or even fully, decoupled from the movement of the crankshaft. The cylinder head 3 furthermore comprises a fuel injector and a spark plug.

The exhaust gas tract 4 branches off from the combustion chamber of the engine block 2, and the turbine 41 of the exhaust gas turbocharger, a three-way catalytic converter, and a particle filter are arranged in its continuation.

The internal combustion engine illustrated in FIG. 2, moreover has a fuel supply apparatus which supplies the fuel injector with fuel. The fuel is here conveyed from the fuel tank 5 by an electric fuel pump generally arranged inside the fuel tank and having a prefilter and is then fed to the fuel injector via a high-pressure pump which is not illustrated.

Furthermore, the diagram illustrated in FIG. 2 has a tank purge device 6. This tank purge device includes an activated carbon filter 61 which is connected to an air filter 69 via a ventilation valve 70. The ventilation valve 70 can be actuated by way of control sensors from the control unit 8.

Moreover, the activated carbon filter 61 is connected to the intake tract 1 of the internal combustion engine at a location between the air filter 11 and the compressor 14 via a purge line 65 in which a purge pump 67 and a tank purge valve 66 are arranged. The tank purge valve 66 and the purge air pump 67 can be actuated by way of control signals output by the control unit 8 in order to adjust the flow of gas through the purging line 65. A pressure sensor 68a, the output signals of which are supplied to the control unit 8, is arranged in the purging line 65, upstream from the purge air pump 67. A further pressure sensor 68b, the output signals of which are likewise supplied to the control unit 8, is arranged in the purging line 65, downstream from the purge air pump 67.

The activated carbon filter 61 is moreover connected to the fuel tank 5 via a connecting line. The evaporative emissions which occur in the fuel tank, such as the volatile hydrocarbons, are led into the activated carbon filter 61 and are adsorbed there by the activated carbon situated therein.

The control unit 8 has a computing unit 81, a program memory 82, and a data memory 83. Work programs for the computing unit 81 are saved in the program memory 82. Data which is required for operation of the internal combustion engine is saved in the data memory 83. The output signals of a plurality of sensors are furthermore supplied to the control unit 8 as input signals ES. These sensors include, inter alia, the pressure sensors 68a and 68b, an air mass sensor which detects an air mass flow in the intake tract 1 upstream from the compressor 14, a temperature sensor which detects an intake air temperature, a temperature sensor which detects the temperature of the coolant of the internal combustion engine, and a further pressure sensor which detects the pressure in the intake tract 1 downstream from the throttle valve 17. At the output side, the control unit 8 provides control signals AS which it determines using the work programs, the stored data, and the sensor signals supplied to it. These control signals include, inter alia, control signals for the ventilation valve 70, the purge air pump 67, and the tank purge valve 66.

With the aid of the purge air pump 67, it is possible to adjust a desired purging flow of the purge gas (HC/air mixture) from the activated carbon filter 61 for all operating points of the internal combustion engine.

In the case of a hybrid vehicle which has an internal combustion engine and an electric motor, the internal combustion engine is activated only when the battery state of the hybrid vehicle falls below a predetermined threshold value or when a temporary torque requirement exceeds a predetermined different threshold value.

If, in the case of such a hybrid vehicle, a non-sealed tank is used, the penetration of hydrocarbons must be detected in order to activate the internal combustion engine and suck the fuel gases stored in the activated carbon filter into the intake tract 1 via the purging line 65 before hydrocarbons pass into the atmosphere.

In order to detect such perforation of hydrocarbons, in the electric mode of the hybrid vehicle, the purge air pump 67 is activated and detection of the concentration of hydrocarbons present in the activated carbon filter 61 is performed with the purge air pump 67 activated.

In some implementations, t the activation of the purge air pump 67 takes place immediately after vehicle start-up for electric driving, i.e., as a reaction to a vehicle start-up for electric driving. The detection of the concentration of hydrocarbons present in the activated carbon filter 61 is initiated immediately after the activation of the purge air pump.

In order to perform this detection, the speed of the purge air pump 67 is regulated to a predetermined target speed, for example to 3000 revolutions per minute. The ventilation valve 70 arranged between the fresh air filter 69 and the activated carbon filter 61 is furthermore opened in order to avoid the creation of a vacuum in the tank during the operation of the pump. Moreover, the tank purge valve 66 is closed and held in the closed state so that the gas sucked in by the pumping procedure remains only in the purging line 65 between the closed tank purge valve 66 and the purge air pump 67 and does not pass into the intake tract 1. This has the consequence that fresh air is sucked from outside through the air filter 69 and the opened ventilation valve 70, through the activated carbon filter 61 and the purge air pump 67 into the area of the purging line situated between the purge air pump and the tank purge valve until a pressure equilibrium is set by the increase in pressure which takes place. In this procedure, evaporative emissions stored in the activated carbon filter and which are part of the hydrocarbon gases are carried along into the area of the purging line situated between the purge air pump and the tank purge valve.

A pressure difference is computed by the control unit from a measurement of the pressure by the pressure sensor 68a arranged upstream from the purge air pump 67, and by the pressure sensor 68b arranged downstream from the purge air pump. The control unit 8 computes the concentration of hydrocarbons present in the activated carbon filter from this pressure difference and the pump speed. The following equation is applied, $$\rho = \frac{\Delta P_{APP}}{2(\pi r f)^2}$$

$\Delta_- $ = pressure difference

= density of gas $f$ = pump speed

The concentration of hydrocarbons is directly proportional to density—atmospheric density.

If the concentration of hydrocarbons present exceeds a predetermined threshold value, the internal combustion engine is activated and the evaporative emissions stored in the activated carbon filter are sucked into the intake tract 1 and supplied to the combustion process until the hydrocarbon load of the activated carbon filter 61 is again below a predetermined further threshold value. If this is the case, the internal combustion engine can then be switched off again and driving the hybrid vehicle using electric power continued.

If, in the case of the described determination of the concentration of hydrocarbons present in the activated carbon filter, it is in contrast determined that the determined concentration of hydrocarbons does not exceed the predetermined threshold value, the purge air pump is then switched off again and driving the hybrid vehicle using electric power continued.

Accordingly, a check is automatically made after each vehicle start-up for electric driving as to whether the temporary loading of the activated carbon filter with hydrocarbon gases is so great that there is a risk of penetration of hydrocarbons and that hydrocarbon gases can pass to the atmosphere. To make this check, the purge air pump is activated and regulated to a predetermined speed, a ventilation valve arranged between the air filter and the activated carbon filter is opened, the tank purge valve is closed, a pressure difference between the pressure upstream from the purge air pump and the pressure downstream from the purge air pump is computed and the hydrocarbon load of the activated carbon filter is determined from the determined pressure difference and the pump speed. If the determined hydrocarbon load of the activated carbon filter is greater than a predetermined threshold value, in order to reduce the concentration of hydrocarbons, evaporative emissions stored in the activated carbon filter are then sucked into the intake tract of the internal combustion engine and are supplied to the combustion process. Driving the hybrid vehicle using electric power is then continued.

In some examples, the purge air pump 67 is activated automatically immediately after a vehicle start-up for electric driving in order to check immediately after the vehicle start-up for electric driving as to whether there is a risk of imminent penetration of hydrocarbons or whether this is not the case.

In some implementations, this check is made depending on one or more further criteria. One further criterion is the respective most recent measurement of the hydrocarbon load of the activated carbon filter.

If, for example, the hydrocarbon load determined in the most recent measurement of the hydrocarbon load of the activated carbon filter was relatively low, it is then possible to dispense with a repeated measurement of the hydrocarbon load of the activated carbon filter after the current vehicle start-up for electric driving.

If, in contrast, the hydrocarbon load determined in the most recent measurement of the hydrocarbon load of the activated carbon filter was already relatively high, a repeated measurement of the hydrocarbon load of the activated carbon filter is performed after the current vehicle start-up for electric driving.

The period of time between the most recent measurement of the hydrocarbon load of the activated carbon filter and the current vehicle start-up for electric driving can also be used as a further or additional criterion.

If this period of time is short, it is possible to dispense with repeated measurement of the hydrocarbon load of the activated carbon filter after the current vehicle start-up for electric driving.

If, in contrast, this period of time is long, a repeated measurement of the hydrocarbon load of the activated carbon filter is performed after the current vehicle start-up for electric driving.

The maximum temperature between the most recent measurement of the hydrocarbon load of the activated carbon filter and the current vehicle start-up for electric driving can also be used as a further or additional criterion.

If this maximum temperature is relatively high, a repeated measurement of the hydrocarbon load of the activated carbon filter is then performed after the current vehicle start-up for electric driving.

If, in contrast, this maximum temperature is relatively low, a repeated measurement of the hydrocarbon load of the activated carbon filter is then dispensed with after the current vehicle start-up for electric driving.

The abovementioned further or additional criteria can also be used together. The higher the ambient temperature since the most recent measurement of the hydrocarbon load of the activated carbon filter and/or the longer the period of time between the most recent measurement of the hydrocarbon load of the activated carbon filter and the current vehicle start-up for electric driving and/or the higher the hydrocarbon load of the activated carbon filter in the most recent measurement of the hydrocarbon load of the activated carbon filter, the greater the need for repeated measurement after the current vehicle start-up for electric driving.

An advantage of the above described method is the fact that it does not require a hydrocarbon sensor or an auxiliary activated carbon filter in order to detect the risk of penetration of hydrocarbons. A further advantage of the disclosure is the fact that redistribution of the concentration of hydrocarbons is effected by the purge air pump. This has the consequence that the concentration of hydrocarbons in the activated carbon filter close to the connecting line to the ventilation valve is less than it is close to the line to the purge air pump. It can consequently be achieved that, even when the measured concentration of hydrocarbons already exceeds the predetermined threshold, there is still no penetration of hydrocarbons in the direction of the ventilation valve.

A number of implementations have been described. Nevertheless, it will be understood that various modifications may be made without departing from the spirit and scope of the disclosure. Accordingly, other implementations are within the scope of the following claims.

What is claimed is:

1. A method for operating a hybrid vehicle which has an internal combustion engine, an electric motor, a fuel tank, an activated carbon filter, an air filter, an intake tract, a purging line arranged between the activated carbon filter and the intake tract, a purge air pump arranged between the activated carbon filter and the intake tract, a tank purge valve arranged between the purge air pump and the intake tract, and a ventilation valve arranged between the air filter and the activated carbon filter, the method comprising:

during an electric mode of operation:
      activating the electric motor,
      deactivating the internal combustion engine,
      activating the purge air pump,
      detecting a concentration of hydrocarbons present in the activated carbon filter while the purge air pump is activated,
      regulating a speed of the purge air pump to a predetermined target speed,
      opening the ventilation valve arranged between the air filter and the activated carbon filter, and
      closing the tank purge valve.

2. The method of claim 1, wherein during the electric mode of operation, the method includes:
   determining a pressure difference between a pressure value upstream from the purge air pump and a pressure value downstream from the purge air pump,
   wherein the determined pressure difference and the speed of the purge air pump are used to determine the concentration of hydrocarbons.

3. The method of claim 2, wherein when the determined concentration of hydrocarbons is greater than a predetermined first threshold value, the method further includes:
   activating the internal combustion engine; and
   opening the tank purge valve causing evaporative emissions stored in the activated carbon filter to be conveyed through the opened tank purge valve into the intake tract until the concentration of hydrocarbons is less than a predetermined second threshold value.

4. The method of claim 3, wherein when the determined concentration of hydrocarbons does not exceed the predetermined first threshold value, the method includes deactivating the purge air pump again.

5. The method of claim 1, further comprising:
   activating the purge air pump during the electric mode of operation as a reaction to a vehicle start-up for electric driving immediately after the vehicle start-up for electric driving.

6. The method of claim 1, wherein the detection of the concentration of hydrocarbons present in the activated carbon filter is performed with the purge air pump activated.

7. The method of claim 6, wherein the detection of the concentration of hydrocarbons present in the activated carbon filter is performed immediately after the activation of the purge air pump.

8. The method of claim 7, wherein the detection of the concentration of hydrocarbons present in the activated carbon filter is performed after the activation of the purge air pump depending on one or more further criteria.

9. The method of claim 8, wherein a further criterion is a most recent measurement of the concentration of hydrocarbons.

10. The method of claim 9, wherein a further criterion is a value for the concentration of hydrocarbons determined in the most recent measurement of the concentration of hydrocarbons.

11. The method of claim 9, wherein a further criterion is a period of time between the most recent measurement of the concentration of hydrocarbons and the vehicle start-up for electric driving.

12. The method of claim 9, wherein a further criterion is the maximum ambient temperature between the most recent measurement of the concentration of hydrocarbons and the vehicle start-up for electric driving.

13. A device for performing a method for operating a hybrid vehicle, the device comprising:
   an internal combustion engine;
   an electric motor;
   a fuel tank;
   an activated carbon filter;
   an air filter;
   an intake tract;
   a purging line arranged between the activated carbon filter and the intake tract;
   a purge air pump arranged between the activated carbon filter and the intake tract;
   a tank purge valve arranged between the purge air pump and the intake tract;
   a ventilation valve arranged between the air filter and the activated carbon filter; and
   a control unit configured to execute a method comprising:
      during an electric mode of operation:
         activating the electric motor,
         deactivating the internal combustion engine,
         activating the purge air pump,
         detecting a concentration of hydrocarbons present in the activated carbon filter while the purge air pump is activated,
         regulating a speed of the purge air pump to a predetermined target speed,
         opening the ventilation valve arranged between the air filter and the activated carbon filter, and
         closing the tank purge valve.

14. The device of claim 13, wherein during the electric mode of operation, the method includes:
   determining a pressure difference between a pressure value upstream from the purge air pump and a pressure value downstream from the purge air pump,
   wherein the determined pressure difference and the speed of the purge air pump are used to determine the concentration of hydrocarbons.

15. The device of claim 14, wherein when the determined concentration of hydrocarbons is greater than a predetermined first threshold value, the method further includes:
   activating the internal combustion engine; and
   opening the tank purge valve causing evaporative emissions stored in the activated carbon filter to be conveyed through the opened tank purge valve into the intake tract until the concentration of hydrocarbons is less than a predetermined second threshold value.

16. The device of claim 15, wherein when the determined concentration of hydrocarbons does not exceed the predetermined first threshold value, the method includes deactivating the purge air pump again.

17. The device of claim 13, further comprising:
   activating the purge air pump during the electric mode of operation as a reaction to a vehicle start-up for electric driving immediately after the vehicle start-up for electric driving.

18. The device of claim 13, wherein the detection of the concentration of hydrocarbons present in the activated carbon filter is performed with the purge air pump activated.

19. The device of claim 18, wherein the detection of the concentration of hydrocarbons present in the activated carbon filter is performed immediately after the activation of the purge air pump.

20. The device of claim 19, wherein the detection of the concentration of hydrocarbons present in the activated carbon filter is performed after the activation of the purge air pump depending on one or more further criteria.

\* \* \* \* \*